United States Patent [19]

Schuh et al.

[11] Patent Number: 4,981,429
[45] Date of Patent: Jan. 1, 1991

[54] CARRIER ASSEMBLY FOR DIP COATING

[75] Inventors: Richard J. Schuh, Alliance; Ronald E. Timmerman, Salem, both of Ohio

[73] Assignee: McNeil Akron Inc., Akron, Ohio

[21] Appl. No.: 393,942

[22] Filed: Aug. 14, 1989

[51] Int. Cl.⁵ .............................................. B29C 41/02
[52] U.S. Cl. ..................................... 425/270; 264/301
[58] Field of Search ............... 425/269, 270, 272, 273, 425/274, 275, 271; 264/301, 305, 307

[56] References Cited

U.S. PATENT DOCUMENTS

| | | | |
|---|---|---|---|
| 1,075,625 | 10/1913 | Bruckman | 425/270 |
| 2,482,418 | 9/1949 | Jenkins | 425/270 |
| 2,605,505 | 8/1952 | Ruhland | 425/270 |
| 3,278,991 | 10/1966 | Peternell et al. | 425/270 |

Primary Examiner—Willard E. Hoag
Attorney, Agent, or Firm—Oldham & Oldham Co.

[57] ABSTRACT

An improved carrier assembly for the dip coating of latex or rubber-like articles comprises a pair of horizontal members and a vertical member that connect a carriage arm to a form frame. The first horizontal member is attached at one end to the carriage arm and is attached at the second end, which is split to form a clevis into which the first end of the second horizontal member is affixed rotatably. The rotation of the second horizontal member is limited by a pair of adjustment screws. The straight vertical member, having a cam engagement bushing disposed removably thereon, is non-rotatably attached to the second horizontal member at its first end and integrally attached to the form frame at its second end.

6 Claims, 3 Drawing Sheets

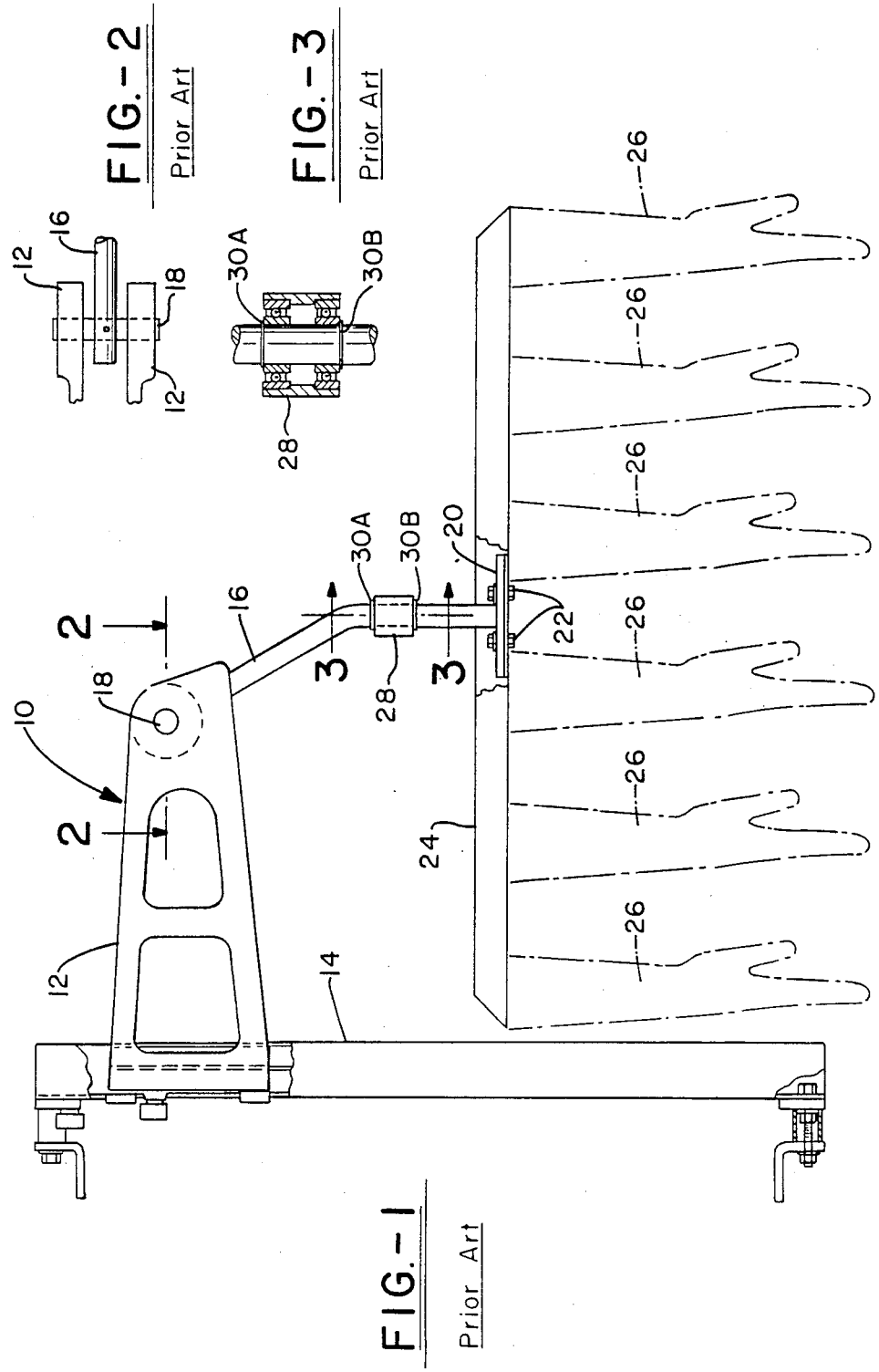

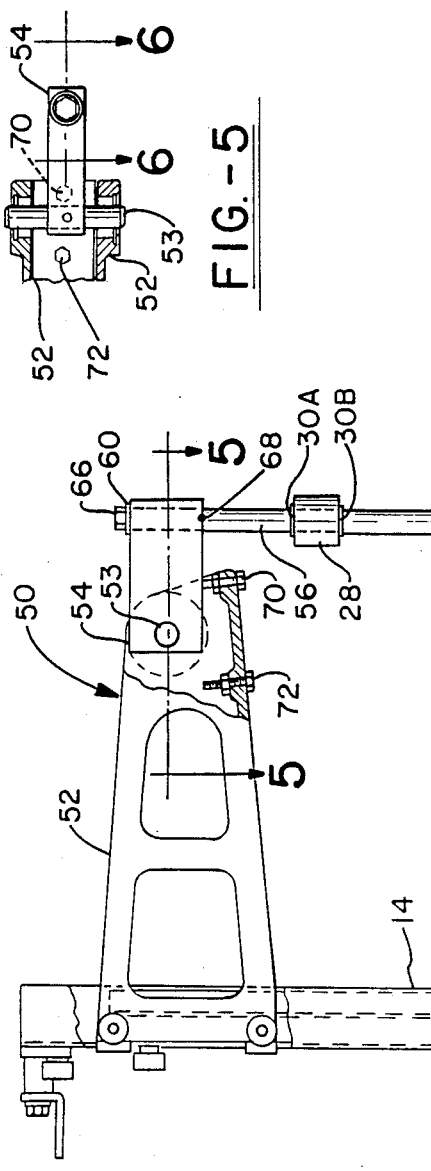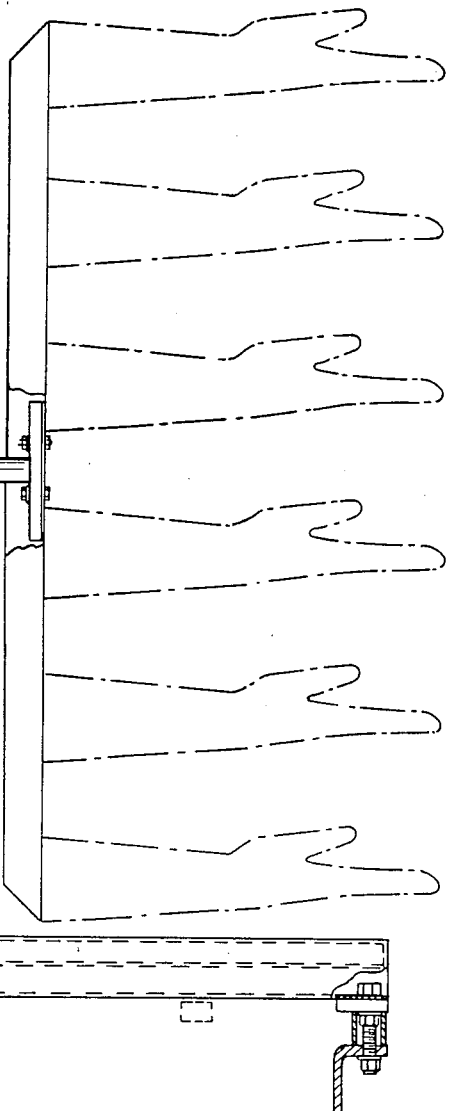
FIG.-5
FIG.-4

CARRIER ASSEMBLY FOR DIP COATING

This invention relates to a mechanical assembly for controlling the position of the form molds used in the production of products via dip coating or immersion casting in a tank or bath of plastic, latex or rubber-like material to make commercially saleable products. More particularly, the invention discloses a carrier assembly for form molds that may be easily disassembled to permit replacement of the cam engagement bushing or changing of the form molds.

BACKGROUND OF THE INVENTION

Dip coating, also known as immersion casting, is well known as a method for producing items of commerce from plastic, latex or rubber-like materials that require a high level of quality control as to thoroughness of coat and uniformity of thickness. One such item of commerce is the flexible surgical glove, the commercial demand for which has dramatically increased in the past several years.

Likewise, the apparatus for dip coating is well known, as exemplified by U.S. Pat. No. 3,278,991, to Peternell and Ritchie. In general, the process of dip coating involves the movement of a plurality of form molds through a controlled and precise sequence of operations in what is attempted to be a minimal amount of floor space. A typical sequence is to pass the form molds through a cleaning and drying stage wherein residue from prior operations is removed, assuring a clean and dry surface on the form molds. The form molds are then passed through a preheat oven wherein the form molds are warmed to a temperature sufficient to help them accept a coagulant solution in which they are next immersed. After being rotated several times in the coagulant solution to obtain a thorough coat, the form molds are withdrawn and immersed in a bath of the latex material in which they are again rotated to assure a thorough coating. The form molds are then raised and passed through a pre-cure oven to reheat the material on the form mold and the form molds are rotated into a leach tank. In further steps, a slurry of powder in water is applied to the latex product now formed on the form mold and the form molds are rotated upwards into a curing oven where final curing of the latex material occurs. After the form molds are cooled and the products tested and removed from the form molds by mechanical means, the cycle is completed by a cleaning and drying of the form molds prior to the onset of the next cycle.

SUMMARY OF THE INVENTION

The principal object of the present invention is to provide a mechanical assembly to precisely control the positioning of the form molds during the production of such latex items. The prior art methods of carrying such form molds on assemblies are not viewed as being precise enough.

It is a further object of the present invention to provide a mechanical assembly that is easily disassembled and which permits rapid replacement of the parts or changing the form molds with minimal disruption to the production cycle.

These and other objects of the invention are achieved by an improved carrier assembly comprising a first horizontal arm, having first and second ends, said first end adapted to be removably attached to said carriage arm and said second end being split to form a clevis and having a horizontal hole bored through both forks of said clevis; a second horizontal arm, also having first and second ends, said first end having a hole bored therethrough horizontally, said first end also articulated between the said forks of said clevis end of the first horizontal arm by a first fastening means passing through said holes in first and second horizontal arms, said second end of second horizontal arm having a hole bored therethrough vertically; a substantially straight vertical support member, having first and second ends, said first end adapted to pass through said vertical hole and be non-rotatably restrained therein by a second fastening means; a cam engagement bushing disposed along the length of said vertical support member and removably retained thereon by a retaining means; and an attachment plate with upper and lower surfaces, said upper surface securely attached to said second end of vertical support member, said lower surface adapted for removably attaching said form frame.

These and other objects of the invention, as well as the several advantages and improved results attributable to the structure disclosed herein, will be apparent in view of the attached drawings and the detailed description thereof which follows.

BRIEF DESCRIPTION OF THE DRAWINGS

In order to better understand the present invention, reference is made to the accompanying drawings, wherein:

FIG. 1 is a side view of the carrier assembly of the prior art.

FIG. 2 is a top detail view of the attachment of the vertical and horizontal support members of the prior art.

FIG. 3 is a detail side view of the cam engagement bushing of the prior art, which is the same as the cam engagement bushing in the present invention.

FIG. 4 is a side view of the carrier assembly of the present invention.

FIG. 5 is a top detail view of the attachment of the first and second horizontal arms of the present invention.

DETAILED DESCRIPTION OF THE DRAWINGS

Figure 6A:
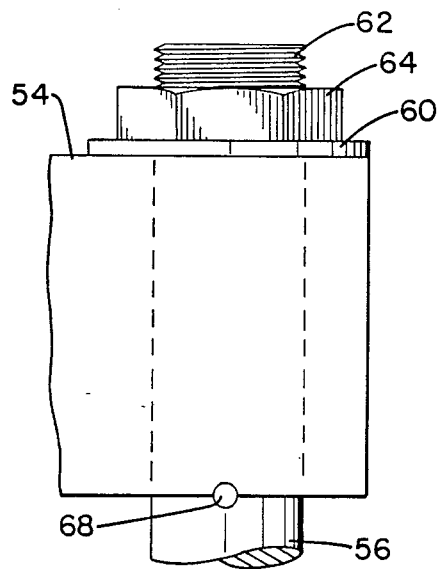
FIG. 6 is a side detail view of the attachment of the second horizontal arm to the vertical support member of the present invention.

The general dip coating carrier assembly 10 known in the prior art is shown in FIG. 1. The dip coating carrier assembly 10 is generally comprised of a horizontal support member 12, a vertical support member 16, an attachment plate 20 and a form frame 24, which is adapted for attaching a plurality of form molds 26.

The horizontal support member 12 is removably attached near the upper end of a carriage arm 14, a series of which are interconnected to provide a conveyor line of carrier assemblies.

The end of the horizontal support member 12 opposite the attachment to the carriage arm 14 is split to form a clevis through which a hole is bored horizontally to receive an attachment rod 18, which is rotatably secured in each fork of the clevis by conventional means, such as bearings, bushings or the like. Further detail of the attachment of the clevis end of the horizontal support member 12 to the vertical support member 16 is provided in FIG. 2.

A vertical support member 16, having a upper and a lower end, is rotatably attached to the clevis end of the horizontal support member 12 by means of the attachment rod 18, which passes through a hole bored in the upper end of the vertical support member 16. The vertical support member 16 and the attachment rod 18 are securely affixed to each other by conventional means, such as a pin or a key. The lower end of the vertical support member 16 is integrally attached to an attachment plate 20, by means of welding or the like. The vertical support member 16 is not straight, but rather has a bend towards the middle of the support member, such that the vertical support member does not pend directly downward from the point of attachment to the horizontal support member. Prior to attachment of the vertical support member 16 to the attachment plate 20, a cam engagement bearing 28 is mounted on the lower portion of the vertical support member, below the bend in such member, and held in place by upper and lower retaining rings, 30A and 30B respectively. Further detail of the engagement of the cam engagement bushing onto the vertical support member is provided in FIG. 3. Thus positioned, the cam engagement bushing 28 can interact with a drive rail structure on the dip coating apparatus, used for selectively causing rotation of the vertical support member around the attachment pin 18. Once attached to the vertical support member, however, the cam engagement bushing is impossible to remove without straightening the vertical support member or removing the attachment plate. The form frame 24 is removably attached to the attachment plate 20 by a plurality of nuts and bolts 22 or similar method, such that the form frame 24 is substantially perpendicular to the lower portion of vertical support member 16.

A plurality of form molds 26 are removably attached to and downwardly pending from the form frame 24. Although the form molds 26 indicated in FIG. 1 are suggestive of a right hand glove, it would be proper to utilize any form mold 26 from which a desired product can be formed by the dip coating method.

As best shown in FIG. 4, the improved carrier assembly is indicated generally by the numeral 50. Unlike the prior art, the invention does not comprise one horizontal support member 12, but instead has a first horizontal arm 52 and a second horizontal arm 54. As in the prior art, the first horizontal arm is removably attached to the carriage arm 14 at its first end and has, at its second end, a clevis through which a horizontal bore has been made.

The second horizontal arm 54 has two holes bored through it: a first hole bored horizontally at its first end and a second hole bored vertically at its second end. The second horizontal arm is held between the forks of the clevis end of the first horizontal arm 52 by a rod 53 passing through the holes bored in the respective horizontal arms. The preferred method of attachment of the rod 53 to the respective horizontal arms 52 and 54 is to have the rod 53 firmly affixed to the second horizontal arm 54 by means of a pin, a key or the like, and to have the rod 53 secured to each side of the clevis of the first horizontal arm by means of bearings, bushings, or the like.

Figure 6B:
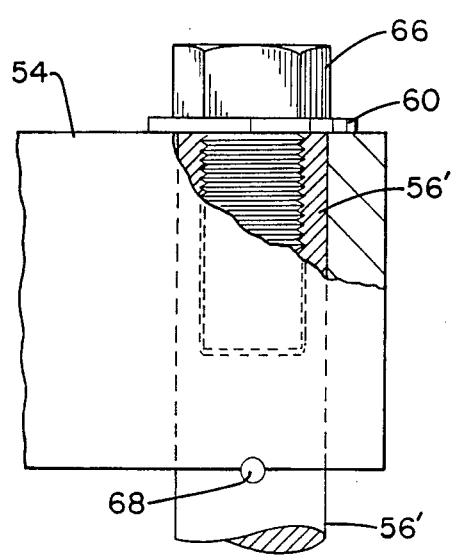

At the second end of the second horizontal arm, a vertical support member 56 is inserted. The vertical support member 56 is firmly attached to the top surface of the second horizontal arm 54 by a bolt 66 inserted into a threaded hole journalled into the top surface of the vertical support arm 56 and a conventional lock washer 60, as shown in more detail in FIG. 6B, a nut 64 secured onto a threaded upper end 64 of the vertical support member and a conventional lock washer 60, as shown in more detail in FIG. 6A, or similar fastening means. The vertical support member 56 is secured to the lower surface of the second horizontal arm 54 by a pin 68 passing through the vertical support member and retained in a semicylindrical channel in the lower surface of the second horizontal arm, so as to prevent rotation of the vertical support member within the hole in the second horizontal arm. This is also shown in detail in FIGS. 6A and B.

Referring now to FIG. 4, an adjustment screw 70 on a lower surface of the clevis end of the first horizontal arm 52 is used to engage the lower surface of the second horizontal arm 54. This adjustment screw 70 is used to limit the rotation of the second horizontal arm 54 about the attachment rod 56, thus determining the substantial perpendicularity of the vertical support member 56 with the ground when the cam engagement bushing 28 is not engaged with the rail track.

The other limit of rotation of the second horizontal arm 54 about the attachment rod 56 is determined by a second adjustment screw 72, which engages the upper surface of the second horizontal arm 54 when the rail track engages the cam engagement bushing 28 and forces it to rotate.

The vertical support member 56 is integrally attached at its lower end to an attachment plate 20, by means of welding or the like. The vertical support member 56 is a substantially straight rod like member, and has a cam engagement bushing 28 mounted near the middle of the vertical support member and secured at the top and the bottom by upper and lower retaining rings 30A and 30B. At the lower end of the vertical support member the attachment plate 20 is removably attached to the form frame 24 by a plurality of nuts and bolts indicated generally by the number 22. As in FIG. 1, FIG. 4 also indicates a form mold 26 suggestive of a right hand glove, although any form mold 26 which is required to form a specific product can be used.

While in accordance with the patent statutes, a preferred embodiment and best mode of the invention have been presented, the scope of the invention is not limited thereto, but rather is measured by the scope of the attached claims.

What is claimed is:

1. An improved carrier assembly for connecting a form frame, having a plurality of form molds affixed to a first surface thereof, to a carriage arm, said improved carrier assembly comprising:

a first arm member, having first and second ends, said first end removably attachable to said carriage arm and said second end being split to form a clevis and having a hole bored through both forks of said clevis;

b. a second arm member, also having first and second ends, said first end having a hole bored therethrough, said first end also articulated between the said forks of said clevis at said second end of the first arm member by a first fastening means passing through said holes in first and second arm members, said second end of second arm member having a hole bored therethrough;

c. an essentially straight third arm member, having first and second ends and an intermediate portion therebetween, said first end passing through said hole in said second end of said second arm member and non-rotatably restrained therein by a second fastening means;

d. a cam engagement bushing disposed along the intermediate portion of said third arm member and removably retained thereon by a retaining means; and e. an attachment plate with first and second surfaces, said first surface securely attached to said second end of said third arm member, said second surface removably attached to said form frame.

2. The carrier assembly of claim 1, wherein said clevis at said second end of said first arm member has a plate attached to the lower surface thereof and has first and second adjustment screws threadingly positioned therethrough, said first and second adjustment screws determining the limits of rotation of said second arm member about said first arm member by respectively bearing upon the lower and upper surfaces of said second arm members at such limits of rotation.

3. The carrier assembly of claim 1, wherein the first fastening means comprises an attachment rod rotatably held in each fork of said clevis by a bearing and securely attached to said second arm member by a pin.

4. The carrier assembly of claim 1, wherein the second fastening means comprises a screw passing through a lock washer and threadably inserted into a hole journalled into the first end of said third arm member, said lock washer bearing upon a first surface of said second arm member, and a pin inserted through a hole bored through said third arm member, said pin also engaged by a semi-cylindrical channel routed into the opposing surface of said second arm member.

5. The carrier assembly of claim 1, wherein the second fastening means comprises a lock washer and nut threadably engaged upon the first end of said third arm member, said lock washer bearing upon a first surface of said second arm member, and a pin inserted through a hole bored through said third arm ember, said pin also engaged by a semi-cylindrical channel routed into the opposing surface of said second arm member.

6. The carrier assembly of claim 1, wherein the retaining means comprises an first and a second retaining ring, each said retaining ring removably secured to said third arm member and limiting longitudinal movement of the cam engagement bushing thereon.

* * * * *